(12) United States Patent
Xu et al.

(10) Patent No.: US 10,848,393 B2
(45) Date of Patent: Nov. 24, 2020

(54) COMMUNICATION METHOD, APPARATUS, AND SYSTEM

(71) Applicant: Huawei Technologies Co., Ltd., Shenzhen (CN)

(72) Inventors: Ruiyue Xu, Shanghai (CN); Kai Zhang, Shanghai (CN); Yan Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/664,756

(22) Filed: Oct. 25, 2019

(65) Prior Publication Data

US 2020/0059416 A1 Feb. 20, 2020

Related U.S. Application Data

(63) Continuation of application No. PCT/CN2018/084842, filed on Apr. 27, 2018.

(30) Foreign Application Priority Data

Apr. 27, 2017 (WO) ................ PCT/CN2017/082270

(51) Int. Cl.
*H04M 3/42* (2006.01)
*H04L 12/24* (2006.01)
(Continued)

(52) U.S. Cl.
CPC ............. *H04L 41/50* (2013.01); *H04L 41/06* (2013.01); *H04L 43/0817* (2013.01);
(Continued)

(58) Field of Classification Search
CPC ..... H04L 41/50; H04L 41/06; H04L 43/0817; H04L 43/0823; H04W 4/50; H04W 24/04; H04W 48/18; H04W 88/18
(Continued)

(56) References Cited

U.S. PATENT DOCUMENTS 9,397,905 B1 * 7/2016 Moniz ................ H04L 41/5003
2017/0289791 A1 * 10/2017 Yoo ...................... H04W 68/005
(Continued)

FOREIGN PATENT DOCUMENTS

CN 105516312 A 4/2016
CN 106341832 A 1/2017
(Continued)

OTHER PUBLICATIONS

Samdanis et al., "From network sharing to multi-tenancy: The 5G network slice broker," IEEE Communications Magazine—Communications Standards Supplement, pp. 32-39, Institute of Electrical and Electronics Engineers, New York, New York (Jul. 2016).

(Continued)

*Primary Examiner* — Danh C Le
(74) *Attorney, Agent, or Firm* — Leydig, Voit & Mayer, Ltd.

(57) ABSTRACT

This application provides a communication method, an apparatus, and a system. The method includes: receiving, by a first management unit, a network component notification message sent by a second management unit, where the network component notification message carries tenant service instance information and status information of a network component, the tenant service instance information is corresponding to the status information of the network component, and the status information includes fault information and/or performance information; and determining, by the first management unit, status information of a network slice instance based on the network component notification message, where the status information of the network slice instance is corresponding to the tenant service instance information, and the network slice instance includes the network slice component. The communication (Continued)

method in embodiments of this application can improve network slice management efficiency.

16 Claims, 7 Drawing Sheets

(51) Int. Cl.
    *H04W 4/50*     (2018.01)
    *H04L 12/26*     (2006.01)
    *H04W 24/04*     (2009.01)
    *H04W 48/18*     (2009.01)
    *H04W 88/18*     (2009.01)

(52) U.S. Cl.
    CPC ........... *H04L 43/0823* (2013.01); *H04W 4/50* (2018.02); *H04W 24/04* (2013.01); *H04W 48/18* (2013.01); *H04W 88/18* (2013.01)

(58) Field of Classification Search
    USPC .................................. 455/414.1, 418, 550.1
    See application file for complete search history.

(56) References Cited

U.S. PATENT DOCUMENTS

| | | | | |
|---|---|---|---|---|
| 2018/0332523 A1* | 11/2018 | Faccin | ................ | H04W 36/06 |
| 2018/0376407 A1* | 12/2018 | Myhre | ................. | H04W 76/27 |
| 2019/0174498 A1* | 6/2019 | Samdanis | ............. | H04W 16/10 |
| 2019/0190784 A1* | 6/2019 | Shimojou | ............... | H04M 3/00 |
| 2019/0349270 A1* | 11/2019 | Funane | ................... | H04L 63/00 |
| 2019/0357130 A1* | 11/2019 | Garcia Azorero | .... | H04W 76/12 |
| 2019/0357132 A1* | 11/2019 | Sun | ......................... | H04W 8/18 |
| 2019/0372844 A1* | 12/2019 | Moats | ................ | H04L 67/1095 |

FOREIGN PATENT DOCUMENTS

| | | |
|---|---|---|
| CN | 106549806 A | 3/2017 |
| WO | 2017032280 A1 | 3/2017 |
| WO | 2017058067 A1 | 4/2017 |

OTHER PUBLICATIONS

Pavon et al., "5G NORMA network architecture—intermediate report," 5G Novel Radio Multiservice adaptive network Architecture, pp. 1-158 (Jan. 31, 2017).

"5G Service-Guaranteed Network Slicing White Paper," China Mobile Communications Corporation, Huawei Technologies Co., Ltd., Deutsche Telekom AG, Volkswagen, XP55429602A, pp. 1-26 (Feb. 2017).

* cited by examiner

COMMUNICATION METHOD, APPARATUS, AND SYSTEM

CROSS-REFERENCE TO RELATED APPLICATIONS

This application is a continuation of International Application No. PCT/CN2018/084842, filed on Apr. 27, 2018, which claims priority to PCT Application No. PCT/CN2017/082270, filed on Apr. 27, 2017. The disclosures of the aforementioned applications are hereby incorporated by reference in their entireties.

TECHNICAL FIELD

This application relates to the communications field, and more specifically, to a communication method, an apparatus, and a system.

BACKGROUND

With rapid development of mobile communication, a future mobile communications system needs to meet diversified service requirements, such as enhanced mobile broadband communication, massive machine type communication, and ultra-reliable and low-latency communication. Accordingly, a concept of network slicing is proposed in a next-generation mobile communications system. A network slicing technology means that a network is abstracted logically as one or more network slices, each network slice provides a series of logical network functions, and one network slice may meet a connection communication service requirement of one type of use cases or one use case. The next-generation mobile communications system may include a large quantity of network slices that satisfy different connection capabilities.

In terms of network slice management, operation, and maintenance, how to improve network slice management efficiency needs an urgent solution in the industry.

SUMMARY

This application provides a communication method, an apparatus, and a system, to improve network slice instance management efficiency.

A first aspect provides a communication method, including receiving, by a first management unit, a network component notification message sent by a second management unit, where the network component notification message carries tenant service instance information and status information of a network component, the tenant service instance information is corresponding to the status information of the network component, and the status information includes fault information and/or performance information; and determining, by the first management unit, status information of a network slice instance based on the network component notification message, where the status information of the network slice instance is corresponding to the tenant service instance information, and the network slice instance includes the network slice component.

In this embodiment of this application, the network component notification message sent by the second management unit to the first management unit carries the tenant service instance information, and the tenant service instance information is corresponding to the status information of the network component, so that the first management unit can manage the status information of the network slice instance based on the tenant service instance information, thereby improving network slice instance management efficiency.

Optionally, the first management unit is a unit that manages the network slice instance. The second management unit may be a unit that manages a network slice subnet instance, or the second management unit may be a unit that manages a network function.

Optionally, the first management unit may receive a plurality of network component notification messages. The plurality of network component notification messages may be from a same management unit or different management units. The plurality of network component notification messages may indicate status information of network components included in the network slice instance. Each of the plurality of network component notification messages may carry the tenant service instance information.

Optionally, the fault information and/or performance information may include at least one of the following: a CPU usage, transmission port performance measurement, uplink resource group measurement, a call drop rate, a quantity of user connections, a delay, a throughput, inter-cell handover measurement, and the like.

Optionally, the tenant service instance information includes at least one of the following: a tenant identifier, a service instance identifier, a tenant service instance identifier, network slice selection assistance information, network slice distinguishing information, a network slice type, a tenant level, a network slice sub-type, and a network slice level.

Optionally, the network slice selection assistance information may include network slice selection assistance information (NSSAI) or single-network slice selection assistance information (S-NSSAI).

Optionally, the network slice type may be a service or network slice type (SST). Optionally, the service or network slice type may include but is not limited to URLL, mIoT, and eMBB. In this case, network operation and maintenance personnel may learn of network status information corresponding to different network slice types, that is, network performance and fault information.

The tenant level is used to describe a tenant level of a terminal user that accesses a slice. For example, an eMBB-type network slice is divided into an eMBB, a VIP tenant network slice, an eMBB, a common tenant network slice, and the like. In this case, the network operation and maintenance personnel may learn of network status information corresponding to different levels of tenants, that is, network performance and fault information.

The network slice subtype is used to describe network slice subtypes obtained by breaking down one network slice type. For example, an eMBB-type network slice is divided into an eMBB, AR network slice, an eMBB, V2X network slice, an eMBB, Voice network slice, and the like. In this case, the network operation and maintenance personnel may learn of network status information corresponding to different network slice subtypes, that is, network performance and fault information.

The network slice level is used to describe different network slice levels of a same network slice type. For example, an eMBB-type network slice is divided into an eMBB, a network slice level 1 network slice, an eMBB, a network slice level 2 network slice, an eMBB, a network slice level 3 network slice, and the like. In this case, the network operation and maintenance personnel may learn of network status information corresponding to different network slice levels, that is, network performance and fault information.

Optionally, information about the tenant level, the network slice subtype, and the network slice level may be included in the network slice distinguishing information. For example, the network slice distinguishing information includes 24 bits, of which the first eight bits are the information about the tenant level, the network slice subtype, or the network slice level.

In a possible implementation, before the first management unit receives the network component notification message sent by the second management unit, the method further includes: sending, by the first management unit, network component subscription information to the second management unit, where the network component subscription information includes a statistical granularity, and the network component subscription information is used to instruct the second management unit to report the status information of the network component based on the statistical granularity.

In this embodiment of this application, the first management unit may add the statistical granularity to the network component subscription information sent to the second management unit, so as to instruct the second management unit to report the status information of the network component based on the statistical granularity, thereby improving network slice instance management efficiency.

In a possible implementation, before the first management unit receives the network slice component notification message sent by the second management unit, the method further includes: sending, by the first management unit, network component subscription information to a third management unit, where the network component subscription information includes a statistical granularity, the network component subscription information is used to instruct the third management unit to report the status information of the network component based on the statistical granularity, and the third management unit is configured to manage fault information and/or performance information of the second management unit.

In a possible implementation, the statistical granularity includes at least one of the following: a network slice instance granularity, a network slice subnet instance granularity, and a tenant service instance granularity.

In a possible implementation, before the first management unit receives the network component notification message sent by the second management unit, the method further includes: sending, by the first management unit, first configuration information to the second management unit, where the first configuration information is used to indicate an association relationship between the network component and the tenant service instance information.

In this embodiment of this application, the first management unit may send the first configuration information to the second management unit, where the first configuration information is used to indicate the association relationship between the network component and the tenant service instance information, so that the second management unit reports the status information, of the network component, corresponding to the tenant service instance information, thereby improving network slice management efficiency.

In a possible implementation, the method further includes: sending, by the first management unit, the network slice instance notification message to a fourth management unit, where the network slice instance notification message includes the status information of the network slice instance and the tenant service instance information.

A second aspect provides a communication method, including: generating, by a second management unit, a network component notification message, where the network component notification message carries tenant service instance information and status information of a network component, the tenant service instance information is corresponding to the status information of the network component, and the status information includes fault information and/or performance information; and sending, by the second management unit, the network component notification message to a first management unit that manages a network slice instance, where the network slice instance includes the network component.

In this embodiment of this application, the network component notification message sent by the second management unit to the first management unit carries the tenant service instance information, and the tenant service instance information is corresponding to the status information of the network component, so as to manage the status information of the network slice instance based on the tenant service instance information, thereby improving network slice instance management efficiency.

Optionally, the first management unit is a unit that manages the network slice instance. The second management unit may be a unit that manages a network slice subnet instance, or the second management unit may be a unit that manages a network function.

Optionally, the first management unit may receive a plurality of network component notification messages. The plurality of network component notification messages may be from a same management unit or different management units. The plurality of network component notification messages may indicate status information of network components included in the network slice instance. Each of the plurality of network component notification messages may carry the tenant service instance information.

Optionally, the fault information and/or performance information may include at least one of the following: a CPU usage, transmission port performance measurement, uplink resource group measurement, a call drop rate, a quantity of user connections, a delay, a throughput, inter-cell handover measurement, and the like.

Optionally, the tenant service instance information includes at least one of the following: a tenant identifier, a service instance identifier, a tenant service instance identifier, network slice selection assistance information, network slice distinguishing information, a network slice type, a tenant level, a network slice sub-type, and a network slice level.

Optionally, the network slice selection assistance information may include network slice selection assistance information (NSSAI) or single-network slice selection assistance information (S-NSSAI).

In a possible implementation, before the sending, by the second management unit, the network component notification message to a first management unit that manages a network slice instance, the method further includes: receiving, by the second management unit, network component subscription information sent by the first management unit, where the network component subscription information includes a statistical granularity, and the network component subscription information is used to instruct the second management unit to report the status information of the network component based on the statistical granularity.

In this embodiment of this application, the first management unit may add the statistical granularity to the network component subscription information sent to the second management unit, so as to instruct the second management unit to report the status information of the network component based on the statistical granularity, thereby improving network slice instance management efficiency.

In a possible implementation, the statistical granularity includes at least one of the following: a network slice instance granularity, a network slice subnet instance granularity, and a tenant service instance granularity.

In a possible implementation, before the sending, by the second management unit, the network component notification message to a first management unit that manages a network slice instance, the method further includes: receiving, by the second management unit, first configuration information sent by the first management unit, where the first configuration information is used to indicate an association relationship between the network component and the tenant service instance information.

In this embodiment of this application, the first management unit may send the first configuration information to the second management unit, where the first configuration information is used to indicate the association relationship between the network component and the tenant service instance information, so that the second management unit reports the status information, of the network component, corresponding to the tenant service instance information, thereby improving network slice management efficiency.

A third aspect provides an apparatus, configured to perform the method in the first aspect or any possible implementation of the first aspect. Specifically, the apparatus includes a unit configured to perform the method in the first aspect or any possible implementation of the first aspect.

A fourth aspect provides an apparatus, configured to perform the method in the second aspect or any possible implementation of the second aspect. Specifically, the apparatus includes a unit configured to perform the method in the second aspect or any possible implementation of the second aspect.

A fifth aspect provides a network system, where the system includes the apparatus in the third aspect or the fourth aspect.

A sixth aspect provides an apparatus, where the apparatus includes a communications interface, a memory, a processor, and a bus system. The communications interface, the memory, and the processor are connected by using the bus system. The memory is configured to store an instruction. The processor is configured to execute the instruction stored in the memory, to control the communications interface to receive a signal and/or send a signal. When the processor executes the instruction stored in the memory, the execution enables the processor to perform the method in the first aspect or any possible implementation of the first aspect.

A seventh aspect provides an apparatus, where the apparatus includes a communications interface, a memory, a processor, and a bus system. The communications interface, the memory, and the processor are connected by using the bus system. The memory is configured to store an instruction. The processor is configured to execute the instruction stored in the memory, to control the communications interface to receive a signal and/or send a signal. When the processor executes the instruction stored in the memory, the execution enables the processor to perform the method in the second aspect or any possible implementation of the second aspect.

An eighth aspect provides a network system, where the system includes the apparatus in the sixth aspect or the seventh aspect.

A ninth aspect provides a computer readable medium, configured to store a computer program, where the computer program includes an instruction used to perform the method in the first aspect or any possible implementation of the first aspect.

A tenth aspect provides a computer readable medium, configured to store a computer program, where the computer program includes an instruction used to perform the method in the second aspect or any possible implementation of the second aspect.

DESCRIPTION OF EMBODIMENTS

Figure 1:
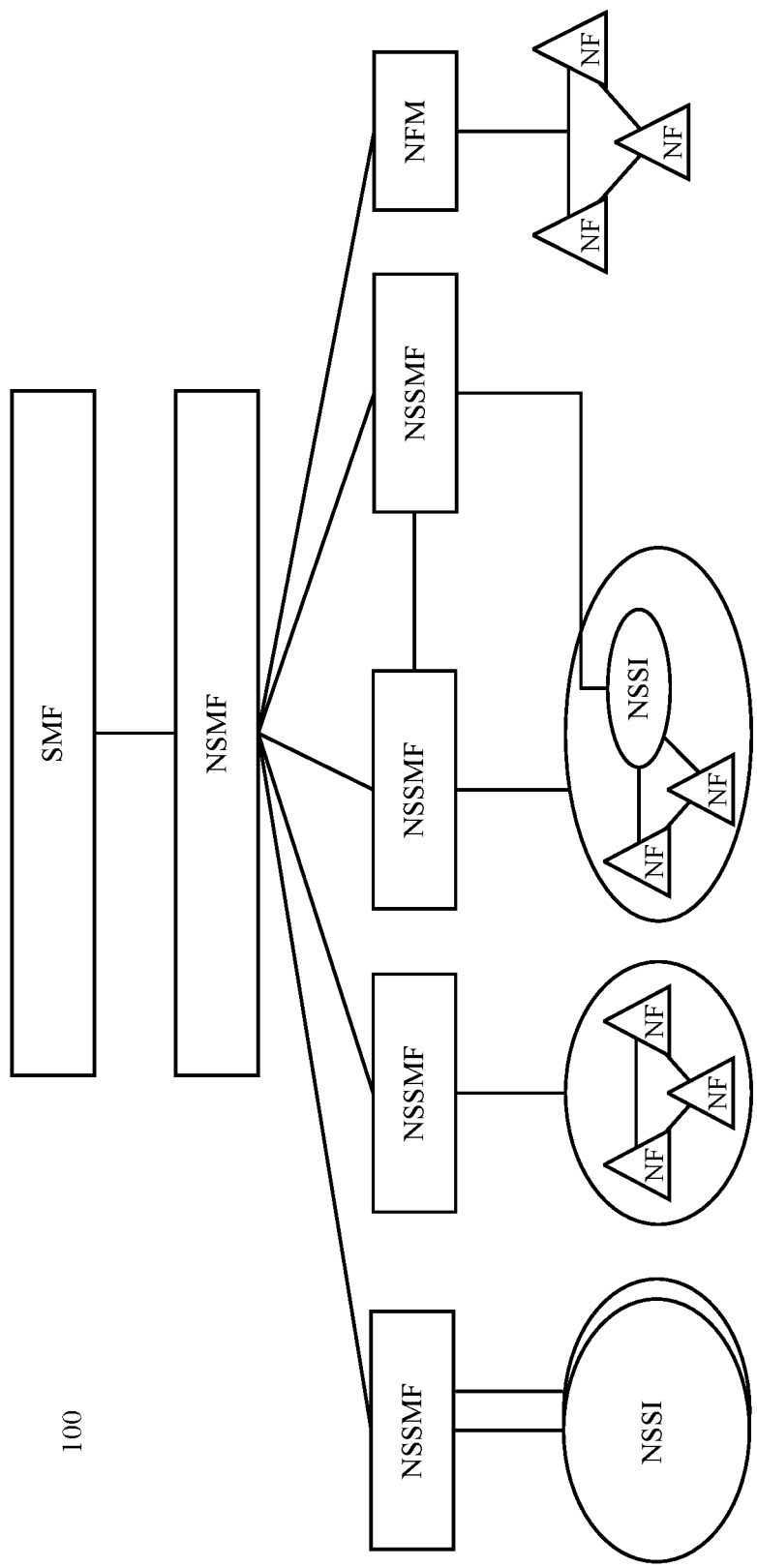
FIG. 1 is a schematic diagram of a network management architecture according to an embodiment of this application.

The following describes the technical solutions of this application with reference to accompanying drawings.

For ease of understanding of content in this application, some terms and a network slice management system in this application are described before description of a method, an apparatus, and a system for managing a network slice instance in this specification.

Network slice (NSL): may also be referred to as a network slice instance (NSI).

A network slice is a logical network customized based on different service requirements on a physical or virtual network infrastructure. Alternatively, a network slice may be considered as a set of network functions and resources that are required for implementing one service or some services. A complete network slice can provide complete end-to-end network services, and the network slice may include a network slice subnet instance and/or a network function.

A network slice may be a complete end-to-end network including a terminal, an access network, a transport network, a core network, and an application server. The network slice is capable of providing telecommunication services and has some network capabilities. The network slice may also be any combination of the foregoing terminal, access network, transport network, core network, and application server. Different network slices may have different features and network functions included therein. Network slices may share some network resources and functions. Network functions may include physical and/or virtual network functions.

The physical and/or virtual network function are collectively referred to as a network function in this specification.

It should be understood that the term "slice" or slice instance mentioned in this specification may be a network slice or a network slice instance. Optionally, in embodiments of this application, a network slice instance may be used to represent a tenant service instance in some scenarios.

Network slice subnet instance: A network slice subnet instance may not need to provide complete end-to-end network services. The network slice subnet instance may be a set of network functions of a same device provider in a network slice instance, or may be a set of network functions divided by domain, for example, a core network slice subnet instance or an access network slice subnet instance, or may be a set of several network functions (these network functions may belong to one or more of an access network, a core network, and a transport network), or a set formed in another manner. A network slice subnet instance may be shared by a plurality of network slice instances. The proposed network slice subnet instance can facilitate management of a network management system. One network slice instance may include several network slice subnet instances, and each network slice subnet instance includes several network functions and/or several network slice subnet instances. One network slice instance may include several network slice subnet instances and a network function that has not been grouped into a network slice subnet instance; or one network slice instance may include only several network functions.

It should be understood that the term "subnet" mentioned in this specification may be a network slice subnet instance.

Network function (NF): is a processing function of a network, and defines a functional behavior and interface. The network function may be implemented by dedicated hardware, or may be implemented by dedicated hardware running software, or may be implemented in a virtual function form on a general-purpose hardware platform. Therefore, in terms of implementation, network functions may be classified as physical network functions and virtual network functions. In terms of use, network functions are classified as dedicated network functions and shared network functions. Specifically, a plurality of network slice instances or network slice subnet instances may independently use different network functions, and such network functions are referred to as dedicated network functions. Alternatively, a plurality of network slice instances or network slice subnet instances may share one network function, and such network function is referred to as a shared network function. A network function may be any one of the following: a core-network network function, an access-network network function, a transmission unit, or a network element (NE). For example, a gNodeB (gNB) in a 5G communications system or an evolved NodeB (eNB) may be considered as a network function.

FIG. 1 is a schematic diagram of a network management architecture 100 according to an embodiment of this application. The following describes functions of all modules in FIG. 1.

Service management function (SMF) is responsible for service related management (including one or more of service operation, lifecycle management, service fault management, service performance management, accounting, customer relationship management, and the like), and provides a service for a terminal. Service management herein may be replaced with a customer unit or a tenant. Alternatively, the service management function may include one or more of the following functions: converting a telecom service requirement of an operator and/or a third-party customer into a network slice requirement, sending a network slice requirement to an NSMF, receiving a subscription requirement of an operator and/or a third-party customer for network slice management data (such as performance data, fault data, and fault rectification data), obtaining network slice management data from an NSMF, and the like.

Network slice management function (NSMF) is also referred as a cross-domain slice manager (CDSM) unit, and provides a management function and/or an orchestration function of a network slice (NSL). For example, the NSMF may include some or all of the following functions: network slice management such as network slice lifecycle management, network slice template management, network slice fault management, network slice performance management, and network slice configuration management; mapping between a network slice and a subnet, and mapping between a network slice and a network function; coordination of network resources or service level agreement (SLA) information provided by different sub-domains (such as a core network domain, an access network domain, or a transport network domain); and uniform orchestration of subnet slices and network functions provided by sub-domains, where the uniform orchestration enables a subnet slice or a network function provided by each sub-domain meet a target-service requirement (such as an SLA requirement, a key performance indicator (KPI) requirement, and a quality of service (QoS) requirement).

Network slice subnet management function (NSSMF) is also referred to as a domain slice manager (DSM) unit and provides an intra-domain network slice subnet management function and/or an intra-domain network slice subnet orchestration function. For example, the NSSMF may include some or all of the following functions: intra-domain network slice subnet management, including, for example, subnet lifecycle management (including creation, updating, deletion, and so on), subnet fault management, subnet performance management, and subnet configuration management; intra-domain service management, including, for example, service lifecycle management, service fault management, service performance management, and service configuration management; and intra-domain network resource coordination for uniform orchestration. The network slice subnet management unit may be a domain management unit that manages a single subnet (such as a core network domain slice subnet management function (CN-NSSMF), an access network domain slice subnet management function (AN-NSSMF), and a transport network domain slice subnet management function (TN-DSM)), or may be a domain management unit that manages hybrid subnets. In the latter case, a subnet managed by the domain management unit may include two or all of a core network (CN), an access network (AN), or a transport network (TN).

Network function manager (NFM) module: is also referred to as a network element manager (EM) module configured to manage an NF and/or a network element (NE). As a logical entity, the network function manager module can be independent of an NF/NE, or be located in an NF/NE, or be located in another function module, and is configured to implement NF/NE management such as NF/NE lifecycle management, NF/NE function parameter configuration, and network resource allocation for an NF/NE.

Figure 2:
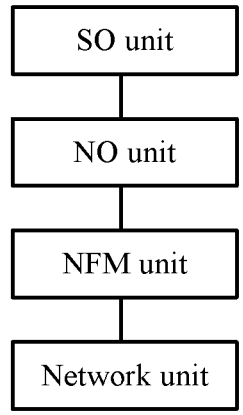
FIG. 2 is a schematic diagram of a network management architecture according to another embodiment of this application.

FIG. 2 is a schematic structural diagram of a network management architecture 200 according to another embodiment of this application. Units in the network management architecture 200 in FIG. 2 are described as follows:

Service orchestrator (SO) unit is also referred to as a service orchestration and management unit or a service management unit, and includes some or all of the following functions: service lifecycle management (such as instantiation, updating, or deletion) based on a service request message; service aggregation; service management such as service fault, configuration, accounting, performance, and security (FCAPS) management; mapping between a service and a network slice; and the like. A service may be a group of specified service level agreement communications services that are available for a user, such as a mobile broadband (MBB) service, a voice service, and an Internet of things (IoT) service (such as an intelligent parking service or an intelligent meter reading service). For example, a SO unit can manage a service carried on a network slice.

Network orchestrator (NO) unit is also referred to as a network orchestration and management unit or a network management unit, and mainly includes some or all of the following functions: network slice management, such as network slice lifecycle management and network slice template management; mapping between a network slice and a network function; coordination between different types of network resources; coordination between network resources provided by different operators and different network providers, to enable the network resources provided by different network providers to meet a target-service requirement, such as an SLA requirement, a key performance indicator (KPI) requirement, and a quality of service (QoS) requirement; uniform orchestration of network devices provided by different providers; and provision of an external application programming interface (API), where the API interface is configured to provide a network function for a third party to implement inter-operator deployment.

Network function manager (NFM) unit is also referred to as a network element manager (EM) unit and mainly includes some or all of the following functions: network element or network function lifecycle management (such as instantiation, updating, or deletion), network element or network function FCAPS management, and the like.

Network unit: The network unit may include at least one of a core network unit, an access network unit, or a transport network unit. It should be noted that the network unit may be replaced with a network function (NF) unit, or the network unit may have a function of a network function unit.

Optionally, the SO unit or NO unit may be deployed in an operations support system (OSS), or the SO unit or NO unit may be deployed independent of the OSS. The OSS may be understood as a support system for device and network maintenance, and is responsible for single-vendor network management or multi-vendor network management.

It can be understood that the foregoing descriptions of functions of various units are merely examples, and the units may further have other functions. This is not limited in the embodiment of the present invention.

Optionally, in an example, the SMF in the network management architecture 100 may be deployed in the SO in the network management architecture 200. Both the NSMF and the NSSMF in the network management architecture 100 may be deployed in the NO in the network management architecture 200.

Optionally, in another example, the SMF in the network management architecture 100 may be deployed in the SO in the network management architecture 200, the NSMF in the network management architecture 100 may be deployed in the NO in the network management architecture 200, and the NSSMF in the network management architecture 100 may be deployed in the NFM in the network management architecture 200.

Optionally, in another example, the SMF and NSMF in the network management architecture 100 may be deployed in the SO in the network management architecture 200, and the NSSMF in the network management architecture 100 may be deployed in the NO in the network management architecture 200.

It should be understood that a network slicing technology is an important technical means for a future network to meet dedicated requirements of different industries or different tenants. To improve network resource utilization and simplify network slice operation and maintenance, same or similar service level agreement (SLA) services of a plurality of tenants may be carried on one network slice instance. For example, a power meter reading service and a water meter reading service may be carried on one meter reading network slice instance. Internet of things services of different vendors may be carried on one network slice instance of an Internet of things service. In this network architecture, if network slice instance monitoring and management are performed on a granularity of a network slice instance, management performance on a granularity of a tenant cannot be presented to a tenant.

In the embodiments of this application, a method for managing and monitoring a network slice instance on a granularity of a tenant service instance is introduced, improving network slice instance management efficiency.

Figure 3:
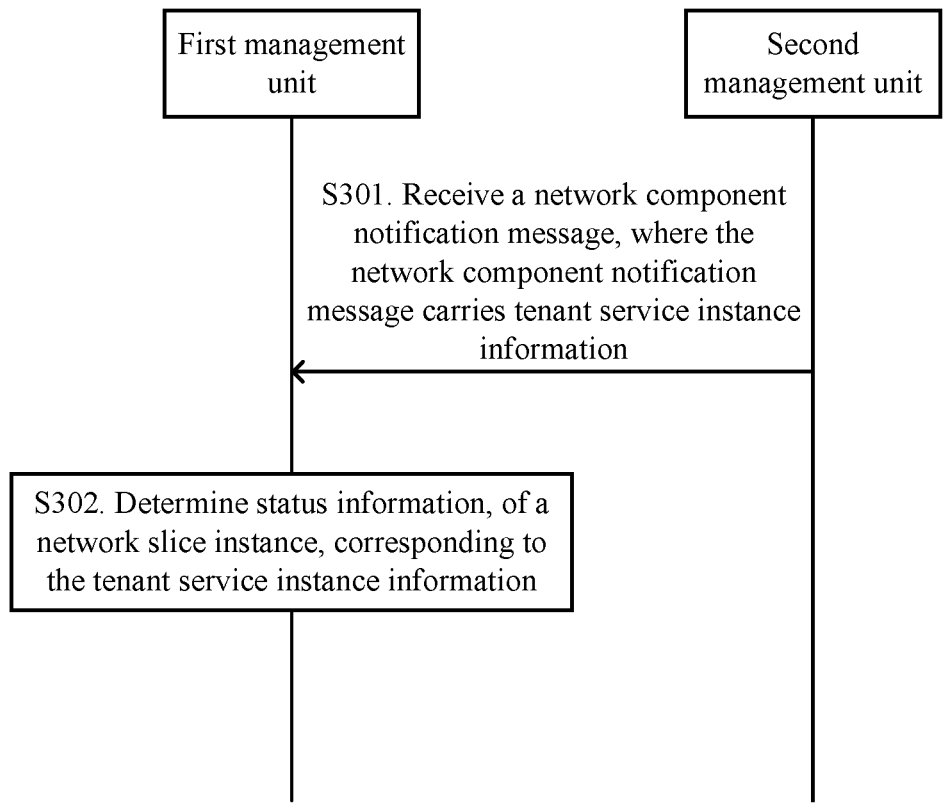
FIG. 3 is a schematic diagram of a communication method according to an embodiment of this application.

FIG. 3 is a schematic flowchart of a communication method 300 according to an embodiment of this application. The method 300 may be applied to the network management architecture 100, the network management architecture 200, a network management architecture 300, or another similar network management architecture. When the method 300 is applied to the network management architecture 100, a first management unit may include the NSMF in the network management architecture 100, and a second management unit may include the NSSMF in the network management architecture 100.

S301. The first management unit receives a network component notification message sent by the second management unit, where the network component notification message carries tenant service instance information and status information of a network component, the tenant service instance information is corresponding to the status information of the network component, and the status information includes fault information and/or performance information.

Optionally, the network component may be a network function or a network slice subnet instance included in the network slice instance.

Optionally, the first management unit is a unit that manages the network slice instance. The second management unit may be a unit that manages a network slice subnet instance, or the second management unit may be a unit that manages a network function.

Optionally, the tenant service instance information may be used to distinguish a plurality of service instances carried on the network slice instance.

Optionally, the status information, of the network component, corresponding to the tenant service instance information may be network component fault and/or performance information corresponding to the tenant service instance information. For example, the tenant service instance information and the status information of the network component may be in one message or in one information element of a message.

In a specific example, it is assumed that the network component notification message is used to indicate a quantity of user connections. The network component notification message may be expressed in a form of a first network slice subnet instance, a first tenant service instance identifier, a quantity of user connections: 200. The network component notification message indicates that the quantity of user connections of the first network slice subnet instance corresponding to the first tenant service instance identifier is 200.

Optionally, the tenant service instance information may include at least one of the following information: a tenant identifier, a service instance identifier, a tenant service instance identifier, network slice selection assistance information, network slice distinguishing information (Slice Differentiator, SD), a network slice type, a tenant level, a network slice sub-type, and a network slice level.

The network slice selection assistance information may include network slice selection assistance information (NSSAI) or single-network slice selection assistance information (S-NSSAI).

Optionally, the first management unit may receive a plurality of network component notification messages. The plurality of network component notification messages may be from a same management unit or different management units. The plurality of network component notification messages may indicate status information of network components included in the network slice instance. Each of the plurality of network component notification messages may carry the tenant service instance information.

Optionally, the fault information and/or performance information may include at least one of the following: a CPU usage, transmission port performance measurement, uplink resource group measurement, a call drop rate, a quantity of user connections, a delay, a throughput, inter-cell handover measurement, and the like.

Optionally, the network component notification message may be sent periodically. Alternatively, the network component notification message may be sent based on a trigger condition. For example, the network component notification message may be sent when a fault occurs or a monitoring parameter exceeds a preset threshold.

Optionally, the second management unit may locally maintain an association relationship between a network slice subnet instance, the tenant service instance information and a network function. For example, a first subnet instance may be associated with a first network function, a second network function, and a third network function. The first network slice subnet instance and a first tenant service instance is associated with the first network function. The first network slice subnet instance, a second tenant service instance are associated with the second network function. The first network slice subnet instance, a third tenant service instance are associated with the third network function. After obtaining network function fault data or performance data, the second management unit may aggregate, based on the locally maintained association relationship between the network slice subnet instance and the tenant service instance information and the network function, the network function fault data or performance data as network slice subnet instance fault data and/or performance data corresponding to the tenant service instance information.

S302. The first management unit determines status information of a network slice instance based on the network component notification message, where the status information of the network slice instance is corresponding to the tenant service instance information, and the network slice instance includes the network slice component.

Optionally, the first management unit may obtain the status information of the network slice instance based on the network component notification message. The first management unit may obtain the status information of the network slice instance based on a single network component notification message, or may obtain the status information of the network slice instance based on a plurality of network component notification messages. The plurality of network component notification messages may be sent by a same management unit or may be sent by a plurality of management units. This is not limited in the embodiment of the present invention.

Optionally, the first management unit may aggregate, based on tenant service instance identifier information, at least one network component notification message as the status information, of the network slice instance, corresponding to the tenant service instance information.

For example, the status information indicates a quantity of user connections. It is assumed that the network slice instance includes the first network slice subnet instance and the second network slice subnet instance. The first management unit may obtain a plurality of network component notification messages, including:

a first network component notification message: the first network slice subnet instance, the first tenant service instance identifier, the quantity of user connections: 200 a second network component notification message: the second network slice subnet instance, the first tenant service instance identifier, a quantity of user connections: 250 and a third network component notification message: the second network slice subnet instance, a second tenant service instance identifier, a quantity of user connections: 200.

The following status information of the network slice instance may be obtained based on the tenant service instance information:

a first network slice instance, the first tenant service instance identifier, a quantity of user connections: 450, and the first network slice instance, the second tenant service instance identifier, a quantity of user connections: 200.

In this embodiment of this application, the network component notification message sent by the second management unit to the first management unit carries the tenant service instance information, and the tenant service instance information is corresponding to the status information of the network component, so that the first management unit can manage the status information of the network slice instance based on the tenant service instance information, thereby improving network slice instance management efficiency.

Optionally, in the method 300, before the first management unit receives the network component notification message sent by the second management unit, the method further includes: sending, by the first management unit, network component subscription information to the second management unit, where the network component subscription information includes a statistical granularity, and the network component subscription information is used to instruct the second management unit to report the status information of the network component based on the statistical granularity.

Optionally, that the network component subscription information is used to instruct the second management unit to report the status information of the network component based on the statistical granularity may be understood as that the network component subscription information is used to instruct the second management unit to report the status information, of the network component, corresponding to the statistical granularity.

Optionally, that the statistical granularity is used to indicate a statistical granularity may be understood as that the statistical granularity may be a granularity corresponding to the status information that the second management unit needs to report.

For example, the statistical granularity may include at least one of the following: a network slice instance granularity, a network slice subnet instance granularity, and a tenant service instance granularity.

Specifically, if the statistical granularity indicates the tenant service instance granularity, the second management unit can report status information, of a network component, corresponding to a tenant service instance. For example, if the status information is a delay, the status information, of the network component, corresponding to a tenant service instance may be expressed as:

(a network slice subnet instance 1, a tenant service instance identifier 1, a delay d1).

If the statistical granularity indicates the network slice subnet instance granularity, the second management unit may report status information, of a network component, corresponding to a network slice subnet instance. For example, if the status information is a delay, the status information, of the network component, corresponding to a network slice subnet instance may be expressed as:

a network slice subnet instance 1, a delay d1.

In this embodiment of this application, the first management unit may send the statistical granularity to the second management unit, to instruct the second management unit to report the status information of the network component based on the statistical granularity, thereby improving network slice instance management efficiency.

Optionally, before the first management unit receives the network slice component notification message sent by the second management unit, the method 300 further includes: receiving, by the second management unit, the network component subscription information sent by the first management unit, where the network component subscription information includes the statistical granularity, and the network component subscription information is used to instruct the second management unit to report the status information of the network component based on the statistical granularity.

The third management unit and the second management unit may manage a network slice subnet in different aspects. For example, the third management unit may be configured to manage and control subscription and authorization of the fault information and/or performance information of the second management unit. The second management unit may be configured to perform storage and analysis.

Optionally, in the method 300, before the first management unit receives the network component notification message sent by the second management unit, the method further includes: sending, by the first management unit, first configuration information to the second management unit, where the first configuration information is used to indicate an association relationship between the network component and the tenant service instance information.

Optionally, the first configuration information may be carried in the network component subscription information, or may be carried in network component creation request information. To be specific, in one management manner, the first management unit may indicate, in the network component subscription information, the association relationship between the network component and the tenant service instance information to the second management unit. In another management manner, when creating the network component, the first management unit may indicate the association relationship between the network component and the tenant service instance information to the second management unit. In this way, the second management unit may locally maintain the association relationship between the network component and the tenant service instance information. When sending the network component subscription information to the second management unit, the first management unit does not need to indicate the association relationship between the network component and the tenant service instance information or carry the tenant service instance information. In the latter management manner, the first management unit may add the statistical granularity to the network component subscription information, so as to instruct the second management unit to report the status information of the network component based on the statistical granularity.

In this embodiment of this application, the first management unit may send the first configuration information to the second management unit, where the first configuration information is used to indicate the association relationship between the network component and the tenant service instance information, so that the second management unit reports the status information, of the network component, corresponding to the tenant service instance information, thereby improving network slice management efficiency.

Optionally, in the method 300, the method further includes: sending, by the first management unit, the network slice instance notification message to a fourth management unit, where the network slice instance notification message includes the status information of the network slice instance and the tenant service instance information.

Optionally, the fourth management unit may be the SMF unit in the network management architecture 100.

Optionally, before the first management unit sends the network slice instance notification message to the fourth management unit, the first management unit may receive a network slice instance subscription message sent by the fourth management unit, where the network slice instance subscription message is used to instruct to obtain network slice instance fault information and/or performance information.

Figure 4:
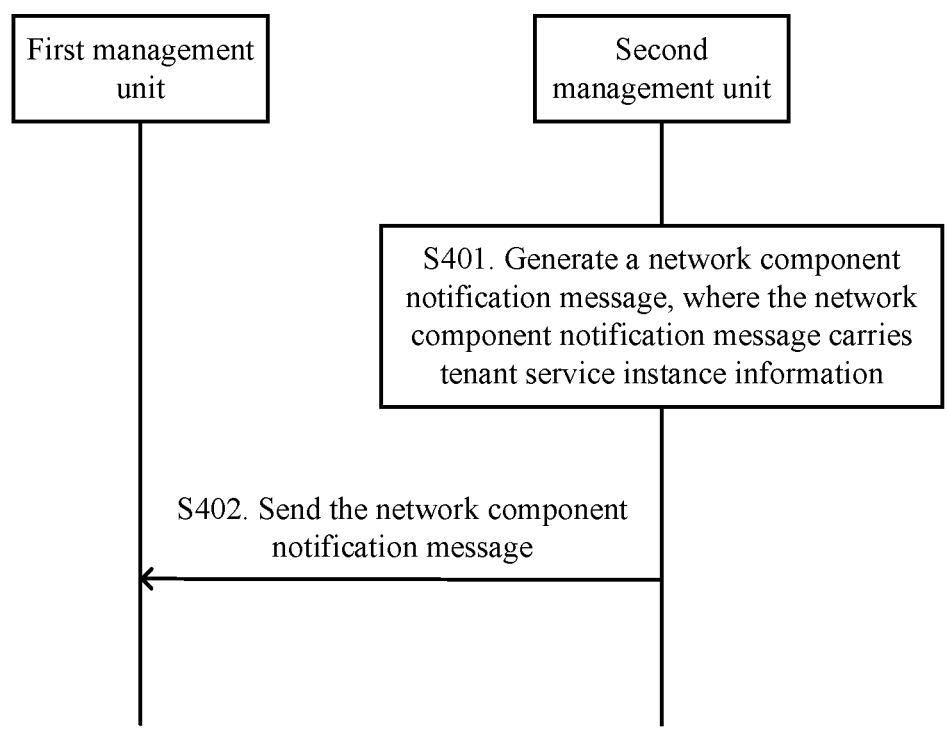
FIG. 4 is a schematic diagram of a communication method according to another embodiment of this application.

FIG. 4 is a schematic diagram of a communication method 400 according to another embodiment of this application. The method 400 may be applied to the network management architecture 100, the network management architecture 200, or another similar network management architecture. When the method 400 is applied to the network management architecture 100, a first management unit may include the NSMF in the network management architecture 100, and a second management unit may include the NSSMF in the network management architecture 100. For content in the method 400 that is the same as or similar to that in the method 300, details are not described herein again.

As shown in FIG. 4, the method 400 includes:

S401. The second management unit generates a network component notification message, where the network component notification message carries tenant service instance information and status information of a network component, the tenant service instance information is corresponding to the status information of the network component, and the status information includes fault information and/or performance information.

S402. The second management unit sends the network component notification message to the first management unit that manages a network slice instance, where the network slice instance includes the network component.

Optionally, in the method 400, the first management unit sends network component subscription information to a third management unit, where the network component subscription information includes a statistical granularity, the network component subscription information is used to instruct the third management unit to report the status information of the network component based on the statistical granularity, and the third management unit is configured to manage fault information and/or performance information of the second management unit.

In this embodiment of this application, the network component notification message sent by the second management unit to the first management unit carries the tenant service instance information, and the tenant service instance information is corresponding to the status information of the network component, so as to manage the status information of the network slice instance based on the tenant service instance information, thereby improving network slice instance management efficiency.

Optionally, in the method 400, the statistical granularity includes at least one of the following: a network slice instance granularity, a network slice subnet instance granularity, and a tenant service instance granularity.

Optionally, in the method 400, before the second management unit sends the network component notification message to the first management unit that manages the network slice instance, the method further includes: receiving, by the second management unit, first configuration information sent by the first management unit, where the first configuration information is used to indicate an association relationship between the network component and the tenant service instance information.

Optionally, in the method 400, the tenant service instance information includes at least one of the following: a tenant identifier, a service instance identifier, a tenant service instance identifier, network slice selection assistance information, network slice distinguishing information, a network slice type, a tenant level, a network slice sub-type, and a network slice level.

Figure 5:
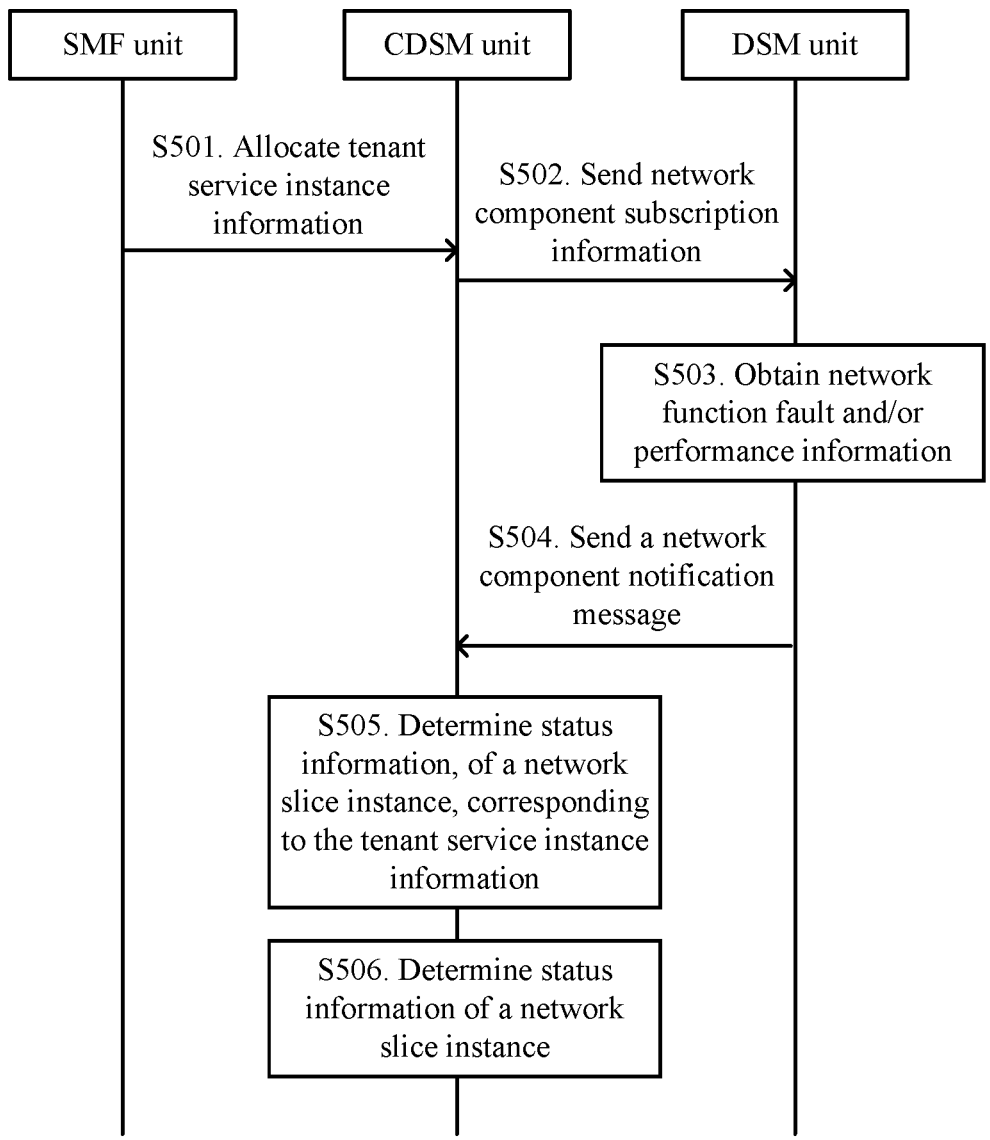
FIG. 5 is a schematic diagram of a communication method according to another embodiment of this application.

In a specific example, FIG. 5 shows a schematic flowchart of a communication method 500 according to an embodiment of this application. The communication method 500 may be applied to the network management architecture 100 or the network management architecture 200. Alternatively, the communication method 500 may be applied to another similar network management architecture. A CDSM unit in the method 500 may be the first management unit in the method 300 and the method 400. A DSM unit in the method 500 may be the second management unit in the method 300 or the method 400. The communication method 500 includes the following steps.

S501. An SMF unit sends allocated tenant service instance information to the CDSM unit.

For example, the SMF unit adds the allocated tenant service instance information to a network slice request or related subscription information sent to the CDSM unit, to indicate an association relationship between the tenant service instance information and a network component included in a network slice instance.

For example, the tenant service instance information may include at least one of the following: a tenant identifier, a service instance identifier, network slice selection assistance information (such as NSSAI and S-NSSAI), and a network slice identifier.

S502. The CDSM unit sends network component subscription information to the DSM unit, where the network component subscription information may include fault subscription information, performance measurement information, or threshold monitoring operation information of the network slice instance.

Optionally, the network component subscription information may be used to instruct the DSM unit to report status information of a network component based on a statistical granularity.

For example, different statistical granularities may be indicated based on different fault types or performance data.

For example, statistics on transmission port performance measurement and uplink resource group measurement may be collected based on a network slice granularity and/or a network slice subnet granularity. For example, it may be indicated that statistics on a call drop rate, a quantity of users, a delay, a throughput, and inter-cell handover measurement are collected based on a tenant service instance information granularity.

S503. The DSM unit obtains network function fault and/or performance information, and aggregates performance or fault data based on the indicated statistical granularity.

When statistics on the fault and/or performance information is collected based on the tenant service instance information granularity, the fault or performance data may be associated with a tenant service instance identifier. The network function fault and/or performance information collected by the DSM unit may carry the tenant service instance information.

S504. The DSM unit sends a network component notification message to the CDSM unit, where the network component notification message may include the network function fault and/or performance information or network slice subnet instance fault and/or performance information. The network component notification message may further include the tenant service instance identifier. The tenant service instance identifier is associated with the network function fault and/or performance information or the network slice subnet instance fault and/or performance information.

S505. The CDSM unit aggregates, based on the tenant service instance information granularity, received fault and/or performance information of network slice subnet instances as status information, of the network slice instance, corresponding to the tenant service instance information. The status information of the network slice instance includes the tenant service instance information, and network slice instance performance or fault data corresponding to the tenant service instance information.

S506. Optionally, the CDSM unit may aggregate fault and/performance information of all tenant service instances carried on the network slice instance, to obtain the network slice instance fault and/performance information.

Figure 6:
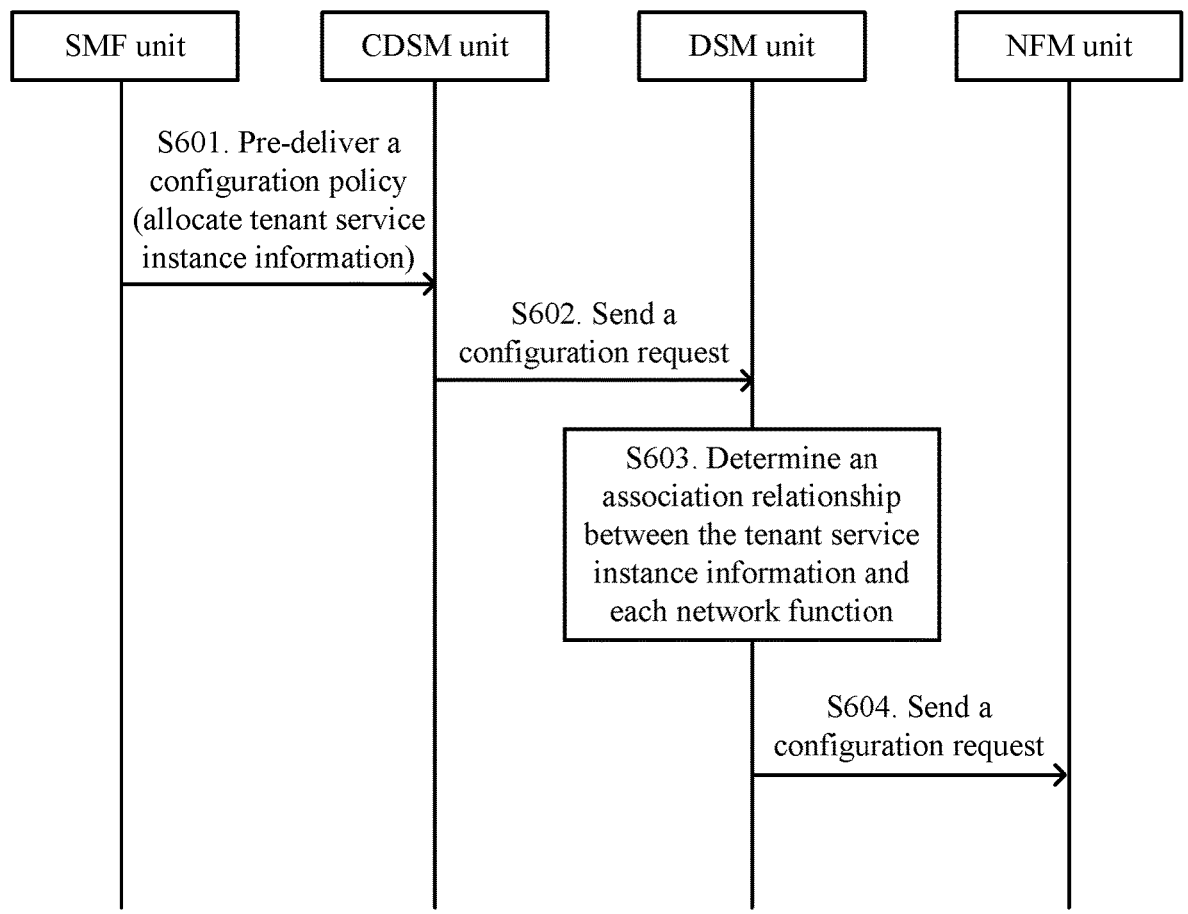
FIG. 6 is a schematic diagram of a communication method according to another embodiment of this application.

In a specific example, FIG. 6 shows a schematic flowchart of a communication method 600 according to an embodiment of this application. The communication method 600 may be applied to the network management architecture 100 or the network management architecture 200. Alternatively, the communication method 600 may be applied to another similar network management architecture. A CDSM unit in the method 600 may be the first management unit in the method 300 and the method 400. A DSM unit in the method 600 may be the second management unit in the method 300 or the method 400. A difference from the method 500 lies in that, in the method 600, an association relationship between a statistical granularity and a network component may be preconfigured for a management unit at each layer. The communication method 600 includes the following steps.

S601. An SMF unit pre-delivers a configuration policy to the CDSM unit, where the configuration policy is used to instruct the CDSM unit to report fault and/or performance information based on a statistical granularity.

For example, the configuration policy may instruct the CDSM unit to report a type 1 parameter based on a tenant service instance information granularity. Alternatively, the configuration policy may instruct the CDSM unit to report a type 2 parameter based on a network slice subnet instance granularity.

For example, the SMF unit may allocate a tenant service instance identifier and add tenant service instance information to a network slice request or related subscription information. The tenant service instance information may include a tenant identifier, a service instance identifier, or the like.

S602. The CDSM unit sends a configuration request to the DSM unit, where the configuration request may carry an association relationship between a tenant instance identifier and a network slice subnet instance.

For example, the association relationship may be expressed as (a tenant service instance identifier, a network slice subnet instance identifier).

S603. The DSM unit determines an association relationship between the tenant service instance information and each network function based on the configuration request.

S604. The DSM unit sends a network element configuration request to each network function management unit (such as an NFM unit), where the request may carry an association relationship between a tenant service instance identifier and a network function identifier.

Optionally, in this embodiment of this application, an association relationship between a network component and a statistical granularity corresponding to fault and/or performance information reporting is preconfigured. Therefore, the subscription request sent by the CDSM unit to the DSM unit or a subscription request sent by the DSM unit to the NFM may carry only the statistical granularity, with no need to carry an association relationship between the tenant service instance information and a network component.

Optionally, if the statistical granularity indicates that the statistical granularity is a tenant service instance level, status information of a network component reported by each unit may carry a tenant service instance identifier. If the statistical granularity is a network slice granularity and/or a subnet granularity, status information of a network component reported by each unit does not need to carry a tenant service instance identifier.

In a specific example, a communication method 700 in the embodiments of this application is described in the following. The communication method 700 may be applied to the network management architecture 100 or the network management architecture 200. Alternatively, the communication method 700 may be applied to another similar network management architecture. A CDSM unit in the method 700 may be the first management unit in the method 300 and the method 400. A DSM unit in the method 700 may be the second management unit in the method 300 or the method 400. An S701 part to an S705 part describe a process of delivering a network slice instance subscription request. S706 to S711 parts describe a process of reporting network slice instance fault and/or performance information. The communication method 700 includes the following steps.

S701. An SMF unit sends a subscription request to the CDSM unit. The subscription request may include a performance subscription request and/or a fault subscription request.

The subscription request may carry tenant service instance information. Specifically, the tenant service instance information may be used to distinguish a plurality of service instances carried on a network slice instance. For example, the tenant service instance information may include a tenant identifier, a service instance identifier, a tenant service instance identifier, network slice selection assistance information, and network slice distinguishing information.

Optionally, the subscription request may carry information indicating an association relationship between the network slice instance and the tenant service instance information.

Optionally, the subscription request of the network slice instance may carry a network slice instance identifier.

S702. After receiving the subscription request, the CDSM determines a network component associated with the tenant service instance information. The network component includes a network slice subnet instance and/or a network function.

Optionally, if the subscription request carries the information indicating the association relationship between the network slice instance and the tenant service instance information, the CDSM may determine the network slice instance based on the subscription request. Further, the CDSM may determine, based on a locally maintained relationship between a network slice instance and a network component, a network component associated with a tenant service instance.

Optionally, if the subscription request carries no network slice instance identifier, the CDSM may find a corresponding network slice instance identifier based on a locally maintained association relationship between tenant service instance information and a network slice instance identifier, and determine an associated network component based on a locally maintained correspondence between a network slice instance identifier and a network component identifier. It should be noted that the network component being the network slice subnet instance is used as an example, one network slice instance may include a plurality of network slice subnet instances, and one network slice instance identifier may correspond to a plurality of network slice subnet instance identifiers.

S703. The CDSM sends a network component subscription request to the DSM. The network component subscription request includes a network component fault subscription request and/or a network component performance subscription request.

Optionally, the network component subscription request may carry the tenant service instance information.

For example, the fault information and/or performance information may include at least one of the following: a CPU usage, transmission port performance measurement, uplink resource group measurement, a call drop rate, a quantity of user connections, a delay, a throughput, inter-cell handover measurement, and the like.

Optionally, the network component subscription request may be used to instruct the DSM to report status information of a network component based on the statistical granularity.

For example, different statistical granularities may be indicated based on different fault types or performance data.

For example, it may be indicated that statistics on a CPU usage, transmission port performance measurement, and uplink resource group measurement are collected based on a network slice granularity and/or a network slice subnet granularity. For example, it may be indicated that statistics on a call drop rate, a quantity of users, a delay, a throughput, and inter-cell handover measurement are collected based on a tenant service instance information granularity.

Optionally, the network component subscription request may further carry a network slice instance identifier.

S704. After receiving the network component subscription request, the DSM unit determines a network function instance associated with the tenant service instance information.

Optionally, the DSM unit may determine, based on a locally maintained association relationship between a network slice subnet instance identifier and a network function instance identifier, the network function instance associated with the tenant service instance information. It should be understood that one network slice subnet instance may include a plurality of network function instances. Therefore, one network slice subnet instance identifier may correspond to a plurality of network function instance identifiers.

Optionally, the DSM may locally maintain an association relationship between (a network slice subnet instance, tenant service instance information) and a network function.

For example, a first network slice subnet instance may be associated with a first network function, a second network function, and a third network function. Specifically, (the first network slice subnet instance, a first tenant service instance) is associated with the first network function, (the first network slice subnet instance, a second tenant service instance) is associated with the second network function, and (the first network slice subnet instance, a third tenant service instance) is associated with the third network function.

S705. The DSM unit sends a network function subscription request to an NFM unit, where the network function subscription request is used to request to obtain corresponding network function instance fault and/or performance information.

Optionally, the NFM unit may be a corresponding network function instance or a network function instance management unit.

Optionally, the network function subscription request may carry the tenant service instance information, a network function identifier, and a fault or performance parameter requested to be subscribed to.

Optionally, the network function subscription request may carry information indicating an association relationship between a network function and the tenant service instance information.

Optionally, the network component subscription request may be used to instruct the DSM to report status information of a network component based on the statistical granularity.

For example, different statistical granularities may be indicated based on different fault types or performance data.

For example, the fault information and/or performance information may include at least one of the following: a CPU usage, transmission port performance measurement, uplink resource group measurement, a call drop rate, a quantity of user connections, a delay, a throughput, inter-cell handover measurement, and the like.

Optionally, the network function subscription request may further carry a network slice instance identifier or a network slice subnet instance identifier.

S706. The NFM unit sends a network function notification message to the DSM unit. The network function notification message includes network function fault and/or performance information.

Optionally, the network function notification message includes the tenant service instance information, and the tenant service instance information is corresponding to the network function fault and/or performance information.

Optionally, the fault information and/or performance information may include at least one of the following: a CPU usage, transmission port performance measurement, uplink resource group measurement, a call drop rate, a quantity of user connections, a delay, a throughput, inter-cell handover measurement, and the like.

Optionally, the network function notification message may be sent periodically. Alternatively, the network function notification message may be sent based on a trigger condition. For example, the network function notification message may be sent when a fault occurs or a monitoring parameter exceeds a preset threshold.

Optionally, the network function notification message may include a network slice subnet instance identifier or a network slice instance identifier.

S707. The DSM unit receives the network function notification message, and determines, based on received network function instance fault or performance information, network slice subnet instance fault or performance information corresponding to a tenant service instance.

In a specific example, the performance information is delay data. When the delay data is corresponding to a same piece of tenant service instance information, the DSM unit may calculate an average value of delays of a same type of network function instance:

PGW delay=(PGW instance 1 delay+PGW instance 2 delay+PGW instance 3 delay)/3.

Then, the DSM unit adds up delays of different types of network function instances to obtain a total delay:

PGW instance 1 delay+SGW instance 1 delay+MME instance 1 delay, where delay indicates a delay, instance indicates different network instances, PGW indicates a packet gateway (PGW), SGW indicates a serving gateway (SGW), and MME indicates a mobility management entity (MME).

In another specific example, the performance data is a delay, and the DSM may receive a plurality of network function notification messages:

an NF instance 1, a tenant service instance identifier 1, a quantity of user connections: 200, an NF instance 2, a tenant service instance identifier 1, a quantity of user connections: 250, and an NF instance 2, a tenant service instance identifier 2, a quantity of user connections: 200.

Then, the DSM unit may obtain a quantity of user connections, of a network slice subnet instance, corresponding to each tenant service instance identifier:

an NF instance 1, a tenant service instance identifier 1, a quantity of user connections: 450, and an NF instance 1, a tenant service instance identifier 2, a quantity of user connections: 200.

The NF instance indicates different network function instances, and the NSSI instance indicates different network slice subnet instances.

Optionally, if a network component notification message reported by the NFM unit does not include the tenant service instance information, the DSM unit aggregates, based on a locally maintained association relationship between a tenant service instance identifier and a network function instance identifier, at least one network component notification message as fault or performance information corresponding to a tenant service instance. Alternatively, the DSM unit may aggregate, based on a locally maintained association relationship between a tenant service instance identifier and a network slice subnet instance identifier/network slice instance identifier, at least one network component notification message as network slice subnet instance fault or performance information corresponding to a tenant service instance.

S708. The DSM unit sends a network slice subnet instance notification message to the CDSM unit. The network slice subnet instance notification message includes the tenant service instance information and network slice instance fault and/or performance information corresponding to the tenant service instance information.

Optionally, the fault information and/or performance information may include at least one of the following: a CPU usage, transmission port performance measurement, uplink resource group measurement, a call drop rate, a quantity of user connections, a delay, a throughput, inter-cell handover measurement, and the like.

Optionally, the network slice subnet instance notification message may be sent periodically. Alternatively, the network slice subnet instance notification message may be sent based on a trigger condition. For example, the network slice subnet instance notification message may be sent when a fault occurs or a monitoring parameter exceeds a preset threshold.

Optionally, the network slice subnet instance notification message may further carry a network slice subnet instance identifier or a network slice instance identifier.

S709. After receiving the network slice subnet instance notification message, the CDSM unit determines, based on the network slice subnet instance notification message, the network slice instance fault and/or performance information corresponding to the tenant service instance information.

In a specific example, the performance information is a delay. It is assumed that a network slice instance includes a network slice subnet instance 1 and a network slice subnet instance 2, and the network slice subnet instance notification message includes:

a network slice subnet instance 1, a tenant service instance identifier 1, a delay d1, the network slice subnet instance 1, a tenant service instance identifier 2, a delay d2, a network slice subnet instance 2, the tenant service instance identifier 1, a delay d3, and the network slice subnet instance 1, the tenant service instance identifier 2, a delay d4.

Then, the CDSM unit may determine network slice instance fault and/or performance information corresponding to each piece of tenant service instance information:

the tenant service instance identifier 1, a network slice instance 1, a delay=d1+d3 and the tenant service instance identifier 2, the network slice instance 1, a delay=d2+d3.

S710. The CDSM unit sends, to the SMF unit, status information, of the network slice instance, corresponding to the tenant service instance information. The status information of the network slice instance may include the fault and/or performance information.

Optionally, the status information of the network slice instance may carry the tenant service instance information.

S711. Optionally, the CDSM unit may aggregate, based on a locally maintained association relationship between a network slice instance and the tenant service instance information, the network slice instance fault and/or performance information corresponding to the tenant service instance information as the network slice instance fault and/or performance information.

For example, the performance information is a quantity of user connections, and a quantity of user connections, of a network slice instance, corresponding to each piece of tenant service instance information is as follows:

a network slice instance identifier 1, the tenant service instance identifier 1, a quantity of user connections: 200 and the network slice instance identifier 1, the tenant service instance identifier 2, a quantity of user connections: 300.

The CDSM unit may aggregate the quantities of user connections, of a network slice instance, corresponding to all tenant service instance information as a quantity of user connections of the network slice instance as follows:

the network slice instance identifier 1, a quantity of user connections: 400.

In a specific example, a communication method 800 in the embodiments of this application is described in the following. The communication method 800 may be applied to the network management architecture 100 or the network management architecture 200. Alternatively, the communication method 800 may be applied to another similar network management architecture. A CDSM unit in the method 800 may be the first management unit in the method 300 and the method 400. A DSM unit in the method 800 may be the second management unit in the method 300 or the method 400. A difference from the method 700 lies in that, in the method 800, an association relationship between a statistical granularity and a network component may be preconfigured for a management unit at each layer. The communication method 800 includes the following steps.

S801. An SMF unit sends a network slice instance creation request to the CDSM unit.

The network slice instance creation request may carry tenant service instance information. Specifically, the tenant service instance information may be used to distinguish a plurality of service instances carried on a network slice instance. For example, the tenant service instance information may include a tenant identifier, a service instance identifier, a tenant service instance identifier, network slice selection assistance information, and network slice distinguishing information.

S802. The CDSM unit may create or reuse a network slice instance based on the network slice instance creation request.

Optionally, the CDSM unit may determine to reuse an existing network slice instance or create a new network slice instance, and maintain or save an association relationship between a network slice instance identifier and the tenant service instance information.

S803. The CDSM unit may send a network slice subnet instance creation or configuration request to the DSM unit.

Optionally, the network slice subnet instance creation or configuration request carries an association relationship between the tenant service instance information and a network slice subnet instance identifier.

S804. The DSM unit creates or configures a network slice subnet instance based on the received network slice subnet instance creation or configuration request.

Optionally, when a network slice subnet instance needs to be created, the DSM unit may create a corresponding network function, and save and maintain the association relationship between a network slice subnet instance identifier and the tenant service instance information or an association relationship between a network function instance and the tenant service instance information.

Optionally, when a network slice subnet instance needs to be configured, the DSM unit may configure or request to configure a corresponding network slice MO or network function MO tenant service instance identifier, or configure or request to configure a tenant service instance identifier of a network function instance.

S805. The CDSM unit sends a network component subscription request to the DSM unit. The network component subscription request includes a network component fault subscription request and/or a network component performance subscription request.

Optionally, the network component subscription request may carry the tenant service instance information.

For example, the fault information and/or performance information may include at least one of the following: a CPU usage, transmission port performance measurement, uplink resource group measurement, a call drop rate, a quantity of user connections, a delay, a throughput, inter-cell handover measurement, and the like.

Optionally, the network component subscription request may be used to instruct the DSM to report status information of a network component based on the statistical granularity.

For example, different statistical granularities may be indicated based on different fault types or performance data.

For example, it may be indicated that statistics on a CPU usage, transmission port performance measurement, and uplink resource group measurement are collected based on a network slice granularity and/or a network slice subnet granularity. For example, it may be indicated that statistics on a call drop rate, a quantity of users, a delay, a throughput, and inter-cell handover measurement are collected based on a tenant service instance information granularity.

Optionally, the network component subscription request may further carry a network slice instance identifier.

S806. The DSM unit sends a network function subscription request to an NFM unit, where the network function subscription request is used to request to obtain corresponding network function instance fault and/or performance information.

Optionally, the NFM unit may be a corresponding network function instance or a network function instance management unit.

Optionally, the network function subscription request may carry the tenant service instance information, a network function identifier, and a fault or performance parameter requested to be subscribed to.

Optionally, the network function subscription request may carry information indicating an association relationship between a network function and the tenant service instance information.

Optionally, the network component subscription request may be used to instruct the DSM to report status information of a network component based on the statistical granularity.

For example, different statistical granularities may be indicated based on different fault types or performance data.

For example, the fault information and/or performance information may include at least one of the following: a CPU usage, transmission port performance measurement, uplink resource group measurement, a call drop rate, a quantity of user connections, a delay, a throughput, inter-cell handover measurement, and the like.

Optionally, the network function subscription request may further carry a network slice instance identifier or a network slice subnet instance identifier.

Content of S907 to S912 parts in the method 800 is the same as the content of the S806 to S811 parts in the method 700, and details are not repeated.

The foregoing details the network slice management methods and the network management architectures according to the embodiments of this application with reference to FIG. 1 to FIG. 6, and the following details apparatuses according to the embodiments of this application with reference to FIG. 7 to FIG. 10.

Figure 7:
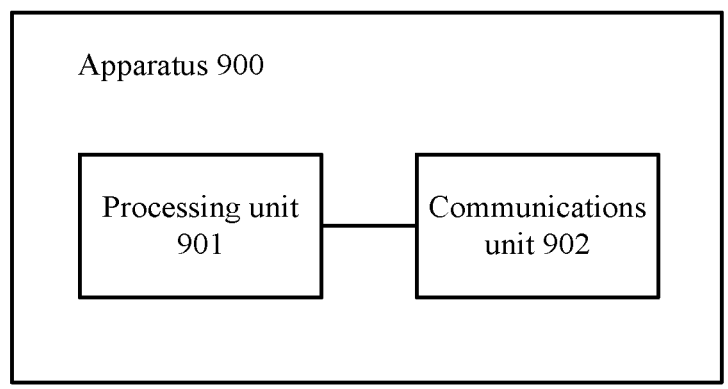
FIG. 7 is a schematic diagram of an apparatus according to an embodiment of this application.

FIG. 7 is a schematic block diagram of an apparatus 900 according to an embodiment of this application. It should be understood that the apparatus 900 can perform all the steps performed by the first management unit in the methods shown in FIG. 1 to FIG. 6. To avoid repetition, details are not described herein again. The apparatus 900 includes a processing unit 901 and a communications unit 902.

The processing unit 901 is configured to: receive, by using the communications unit 902, a network component notification message sent by a second management unit, where the network component notification message carries tenant service instance information and status information of a network component, the tenant service instance information is corresponding to the status information of the network component, and the status information includes fault information and/or performance information; and determine status information of a network slice instance based on the network component notification message, where the status information of the network slice instance is corresponding to the tenant service instance information, and the network slice instance includes the network slice component.

Figure 8:
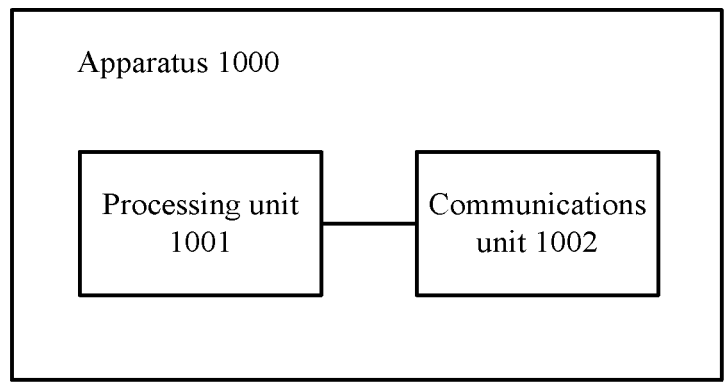
FIG. 8 is a schematic diagram of an apparatus according to another embodiment of this application.

FIG. 8 is a schematic block diagram of an apparatus 1000 according to an embodiment of this application. It should be understood that the apparatus 1000 can perform all the steps performed by the second management unit in the methods shown in FIG. 1 to FIG. 6. To avoid repetition, details are not described herein again. The apparatus 1000 includes a processing unit 1001 and a communications unit 1002.

The processing unit 1001 is configured to: generate a network component notification message, where the network component notification message carries tenant service instance information and status information of a network component, the tenant service instance information is corresponding to the status information of the network component, and the status information includes fault information and/or performance information; and send, by using the communications unit 1002, the network component notification message to a first management unit that manages a network slice instance, where the network slice instance includes the network component.

Figure 9:
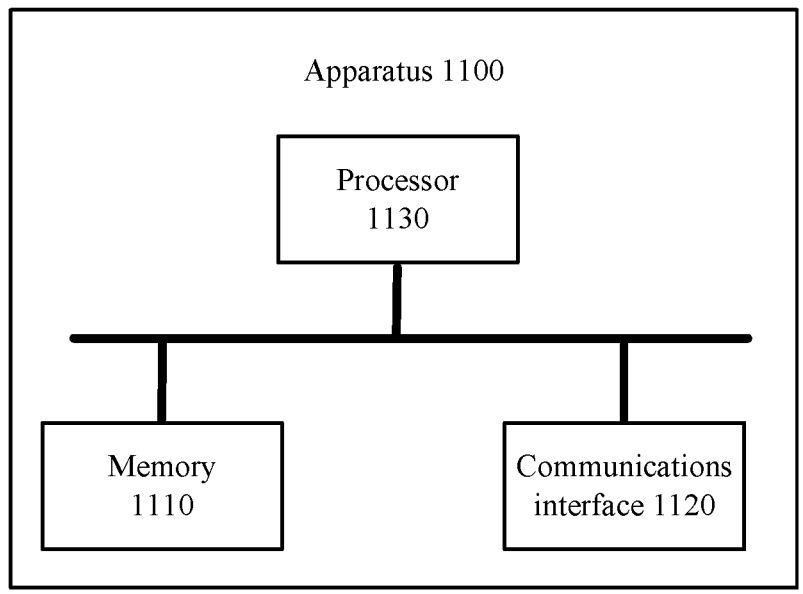
FIG. 9 is a schematic diagram of an apparatus according to another embodiment of this application.

FIG. 9 is a schematic block diagram of an apparatus 1100 according to an embodiment of this application. It should be understood that the apparatus 1100 can perform all the steps performed by the first management unit in the methods shown in FIG. 1 to FIG. 6. To avoid repetition, details are not described herein again. The apparatus 1100 includes:

a memory 1110, configured to store a program;

a communications interface 1120, configured to communicate with another device; and a processor 1130, configured to execute the program in the memory 1110, where when the program is executed, the processor 1130 is configured to receive, by using the communications interface 1120, a network component notification message sent by a second management unit, where the network component notification message carries tenant service instance information and status information of a network component, the tenant service instance information is corresponding to the status information of the network component, and the status information includes fault information and/or performance information; and determine status information of a network slice instance based on the network component notification message, where the status information of the network slice instance is corresponding to the tenant service instance information, and the network slice instance includes the network slice component.

Figure 10:
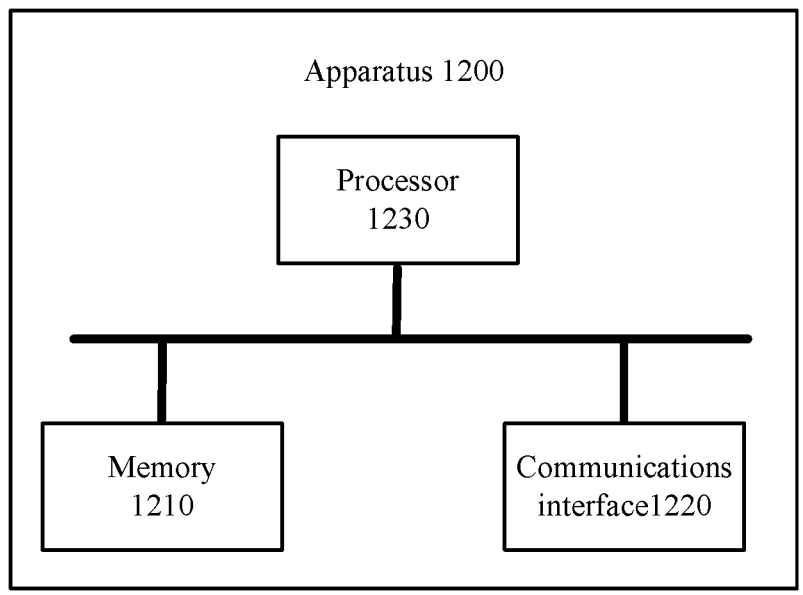
FIG. 10 is a schematic diagram of an apparatus according to another embodiment of this application.

FIG. 10 is a schematic block diagram of an apparatus 1200 according to an embodiment of this application. It should be understood that the apparatus 1200 can perform all the steps performed by the second management unit in the methods shown in FIG. 1 to FIG. 6. To avoid repetition, details are not described herein again. The apparatus 1200 includes:

a memory 1210, configured to store a program;

a communications interface 1220, configured to communicate with another device; and a processor 1230, configured to execute the program in the memory 1210, where when the program is executed, the processor 1230 is configured to generate a network component notification message, where the network component notification message carries tenant service instance information and status information of a network component, the tenant service instance information is corresponding to the status information of the network component, and the status information includes fault information and/or performance information; and send, by using the communications interface 1220, the network component notification message to a first management unit that manages a network slice instance, where the network slice instance includes the network component.

A person of ordinary skill in the art may be aware that the units and algorithm steps in the examples described with reference to the embodiments disclosed in this specification may be implemented by electronic hardware or a combination of computer software and electronic hardware. Whether the functions are performed by hardware or software depends on particular applications and design constraints of the technical solutions. A person skilled in the art may use a different method to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, or unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or may be not performed. In addition, the displayed or discussed mutual couplings or direct couplings or communication connections may be indirect couplings or communication connections through some interfaces, apparatuses, or units, and may be implemented in electrical, mechanical, or other forms.

The units described as separate parts may or may not be physically separate. Parts displayed as units may or may not be physical units, and may be located in one position or distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or an apparatus) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:

sending, by a first management unit, network component subscription information to a second management unit, wherein the network component subscription information comprises a statistical granularity, and the network component subscription information is used to instruct the second management unit to report the status information of the network component based on the statistical granularity;

receiving, by the first management unit, a network component notification message sent by the second management unit, wherein the network component notification message carries tenant service instance information and status information of a network component, the tenant service instance information corresponds to the status information of the network component, and the status information comprises at least one of fault information and performance information; and determining, by the first management unit, status information of a network slice instance based on the network component notification message, wherein the status information of the network slice instance corresponds to the tenant service instance information, and the network slice instance comprises the network component.

2. The method according to claim 1, wherein before the receiving, by a first management unit, a network component notification message sent by a second management unit, the method comprises:

sending, by the first management unit, network component subscription information to a third management unit, wherein the network component subscription information comprises a statistical granularity, the network component subscription information is used to instruct the third management unit to report the status information of the network component based on the statistical granularity, and the third management unit is configured to manage fault information and/or performance information of the second management unit.

3. The method according to claim 1, wherein the statistical granularity comprises at least one of the following: a network slice instance granularity, a network slice subnet instance granularity, and a tenant service instance granularity.

4. The method according to claim 1, wherein before the receiving, by a first management unit, a network component notification message sent by a second management unit, the method comprises: sending, by the first management unit, first configuration information to the second management unit, wherein the first configuration information indicates an association relationship between the network component and the tenant service instance information.

5. The method according to claim 1, further comprising sending, by the first management unit, a network slice instance notification message to a third management unit, wherein the network slice instance notification message comprises the status information of the network slice instance and the tenant service instance information.

6. The method according to claim 1, wherein the tenant service instance information comprises at least one of the following: a tenant identifier, a service instance identifier, a tenant service instance identifier, network slice selection assistance information, network slice distinguishing information, a network slice type, a tenant level, a network slice sub-type, and a network slice level.

7. An apparatus, comprising at least one processor and a transceiver, wherein
the transceiver is configured, in coordination with the at least one processor, to: receive a network component notification message sent by a second management unit, wherein the network component notification message carries tenant service instance information and status information of a network component, the tenant service instance information corresponds to the status information of the network component, and the status information comprises at least one of fault information and performance information, and
send network component subscription information to the second management unit, wherein the network component subscription information comprises a statistical granularity, and the network component subscription information is used to instruct the second management unit to report the status information of the network component based on the statistical granularity; and
the at least one processor is configured to: determine status information of a network slice instance based on the network component notification message, wherein the status information of the network slice instance corresponds to the tenant service instance information, and the network slice instance comprises the network component.

8. The apparatus according to claim 7, wherein the transceiver is further configured, in coordination with the at least one processor, to send network component subscription information to a third management unit, wherein the network component subscription information comprises a statistical granularity, the network component subscription information is used to instruct the third management unit to report the status information of the network component based on the statistical granularity, and the third management unit is configured to manage at least one of fault information and performance information of the second management unit.

9. The apparatus according to claim 7, wherein the statistical granularity comprises at least one of the following: a network slice instance granularity, a network slice subnet instance granularity, and a tenant service instance granularity.

10. The apparatus according to a claim 7, wherein the transceiver is further configured, in coordination with the at least one processor, to send, first configuration information to the second management unit, wherein the first configuration information is used to indicate an association relationship between the network component and the tenant service instance information.

11. The apparatus according to claim 7, wherein the transceiver is further configured, in coordination with the at least one processor, to send a network slice instance notification message to a third management unit, wherein the network slice instance notification message comprises the status information of the network slice instance and the tenant service instance information.

12. The apparatus according to claim 7, wherein the tenant service instance information comprises at least one of the following: a tenant identifier, a service instance identifier, a tenant service instance identifier, network slice selection assistance information, network slice distinguishing information, a network slice type, a tenant level, a network slice sub-type, and a network slice level.

13. A system, comprising a first management unit and a second management unit
the second management unit, configured to: generate a network component notification message, wherein the network component notification message carries tenant service instance information and status information of a network component, the tenant service instance information corresponds to the status information of the network component, and the status information comprises at least one of fault information and performance information; and send the network component notification message to a first management unit that manages a network slice instance, wherein the network slice instance comprises the network component;
the first management unit, configured to: determine status information of the network slice instance based on the network component notification message, wherein the status information of the network slice instance corresponds to the tenant service instance information, and send network component subscription information to the second management unit, wherein the network component subscription information comprises a statistical granularity, and the network component subscription information is used to instruct the second management unit to report the status information of the network component based on the statistical granularity.

14. The system according to claim 13, wherein the statistical granularity comprises at least one of the following: a network slice instance granularity, a network slice subnet instance granularity, and a tenant service instance granularity.

15. The system according to claim 13, wherein
the first management unit, is further configured to: send first configuration information to the second management unit, wherein the first configuration information is used to indicate an association relationship between the network component and the tenant service instance information.

16. The system according to claim 13, wherein the tenant service instance information comprises at least one of the following: a tenant identifier, a service instance identifier, a tenant service instance identifier, network slice selection assistance information, network slice distinguishing information, a network slice type, a tenant level, a network slice sub-type, and a network slice level.

* * * * *

UNITED STATES PATENT AND TRADEMARK OFFICE
CERTIFICATE OF CORRECTION

PATENT NO. : 10,848,393 B2
APPLICATION NO. : 16/664756
DATED : November 24, 2020
INVENTOR(S) : Xu et al.

Page 1 of 1

It is certified that error appears in the above-identified patent and that said Letters Patent is hereby corrected as shown below:

On the Title Page

Foreign Application Priority Data item (30): "Apr. 27, 2017 (WO) ................ PCT/CN2017/082270" should read -- Apr. 27, 2017 (CN) ............... PCT/CN2017/082270 --.

Signed and Sealed this
Twentieth Day of December, 2022

Katherine Kelly Vidal
*Director of the United States Patent and Trademark Office*